United States Patent [19]

Witecki

[11] Patent Number: 4,873,929
[45] Date of Patent: Oct. 17, 1989

[54] PUSHER UNIT

[76] Inventor: Frank J. Witecki, 3885 Harrison St., Gary, Ind. 46408

[21] Appl. No.: 34,388

[22] Filed: Apr. 2, 1987

[51] Int. Cl.$^4$ .......................... B61B 10/04; B61B 13/12
[52] U.S. Cl. .................................. 104/172.3; 198/717
[58] Field of Search ............... 104/172.3, 172.1, 172.5, 104/165; 403/378, 379; 198/717; 74/551.3

[56] References Cited

U.S. PATENT DOCUMENTS

| | | |
|---|---|---|
| 30,026 | 6/1979 | Hanna . |
| 1,932,251 | 10/1933 | Nauts .................................. 74/551.3 |
| 3,554,132 | 1/1971 | Hanna . |
| 4,194,449 | 3/1980 | Breau . |
| 4,374,496 | 2/1983 | Hanna . |
| 4,648,734 | 3/1987 | Daus, Jr. et al. . |

*Primary Examiner*—Henry A. Bennet
*Attorney, Agent, or Firm*—Richard G. Kinney

[57] ABSTRACT

A three-axle, "six-wheel" pusher unit for a carwash system of the type wherein an endless chain moves under a slotted track. The pusher employs a straight bar which can project out of the track, with the track-contacting rollers positioned at the end of the bar and the wire-engaging rollers positioned at an intermediate position. The tire-contacting rollers are formed without internal inletting or open volumes and held in place by button-headed bolts and washers. The under-track forward rollers are secured to a removable axle which is held in a sleeve welded to the end of the bar. This axle is secured by means of a machine screw through the axle and sleeve and nut outside the sleeve. The head of the machine screw is smaller than the hole in the sleeve into which it fits, so as to bear against the axle and hold it tight against the opposite inner surface of the sleeve. In a second embodiment, a hollow rectilinear and tubular bar is employed with the third axle received through side holes and similarly secured.

6 Claims, 3 Drawing Sheets

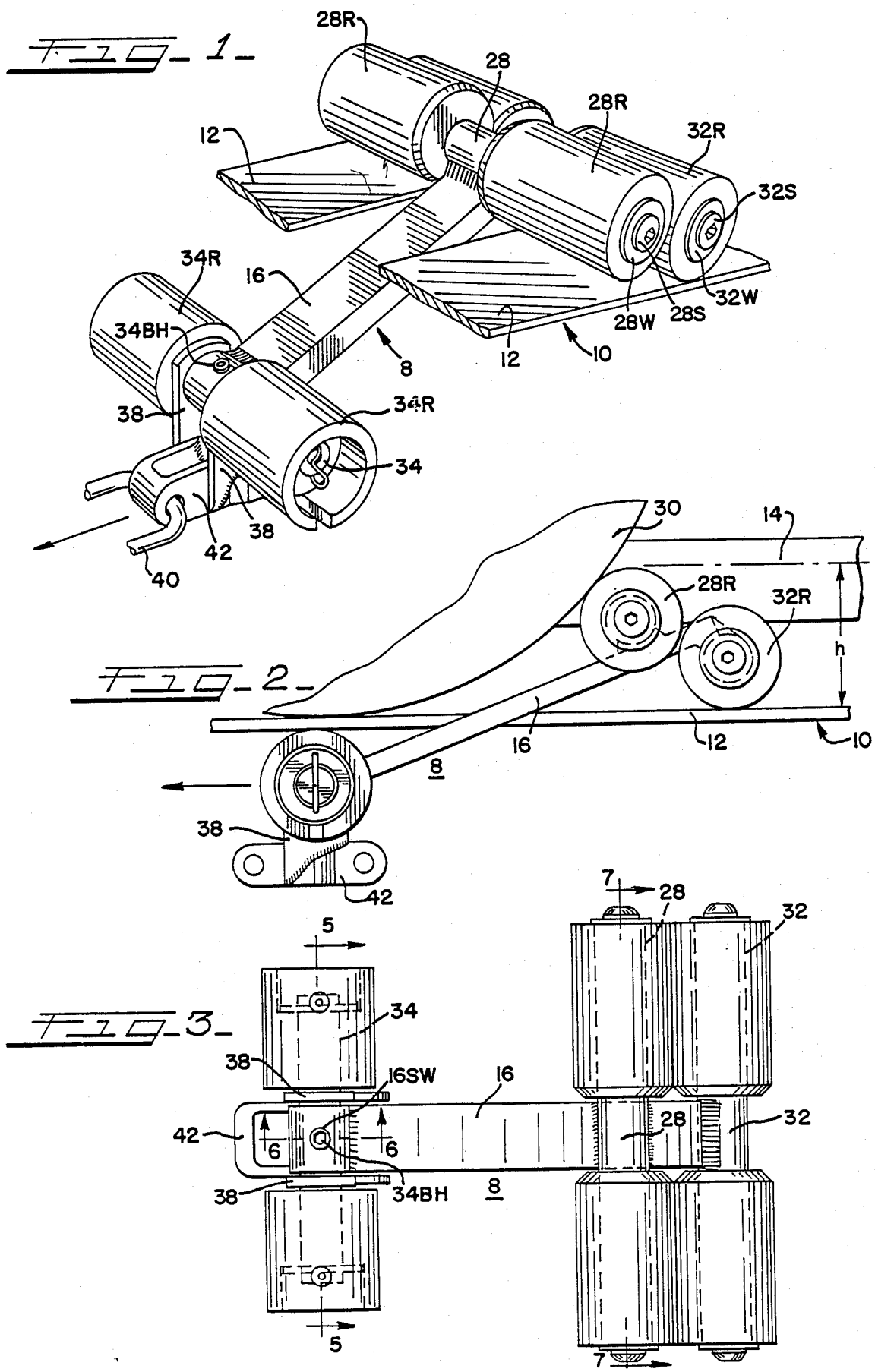

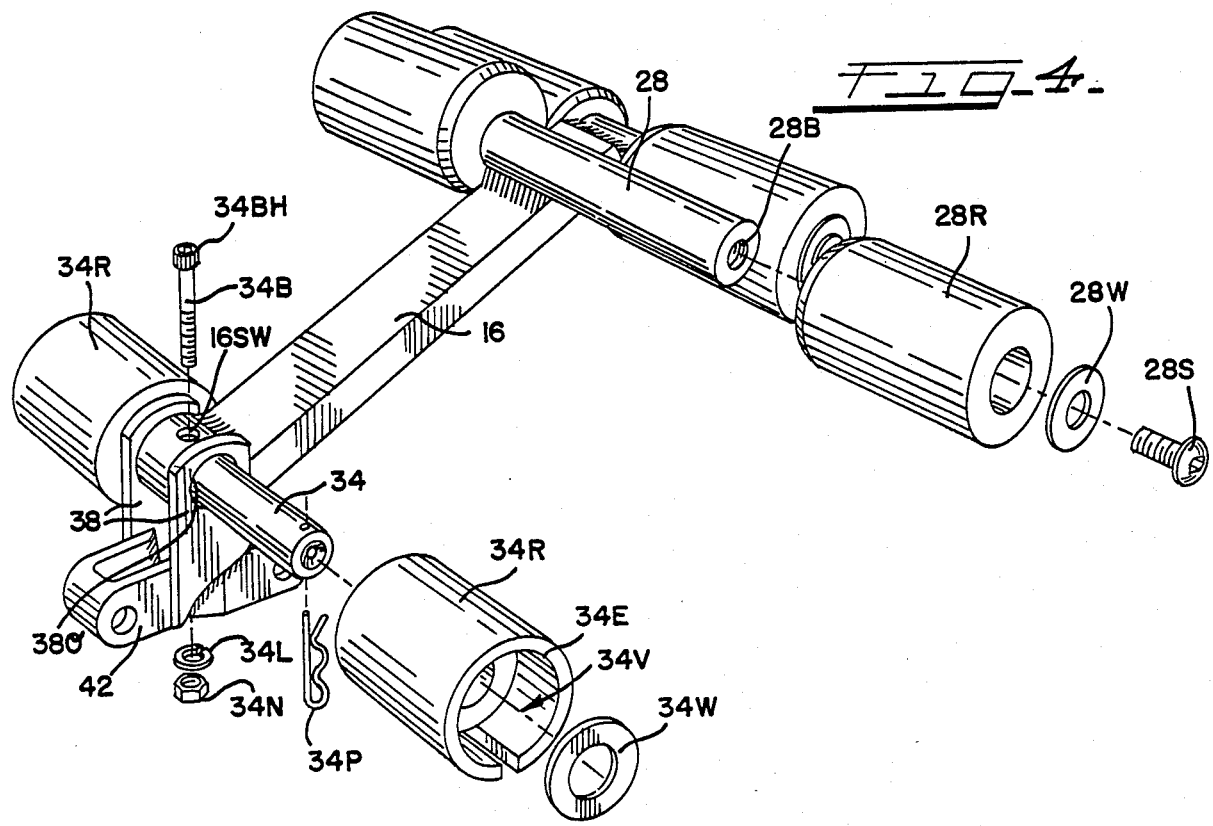
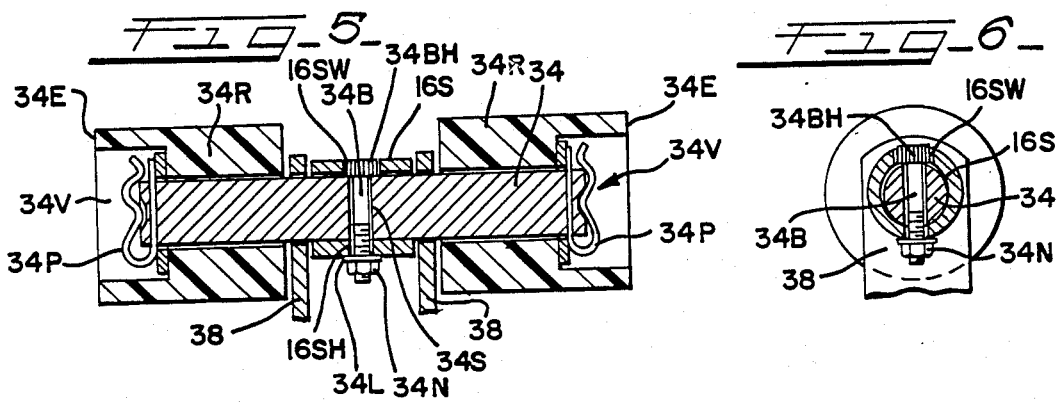
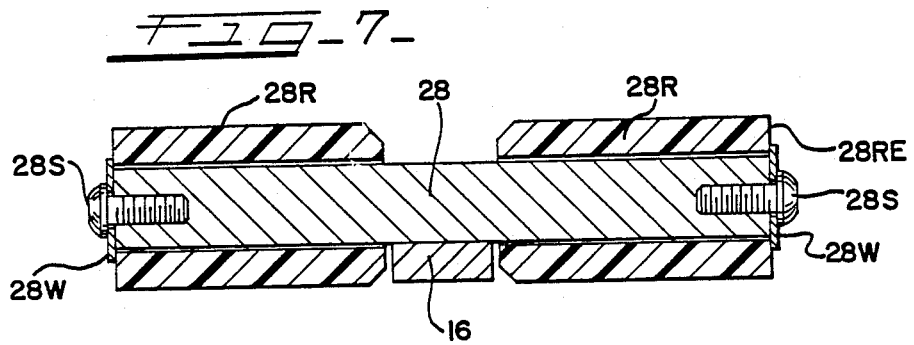

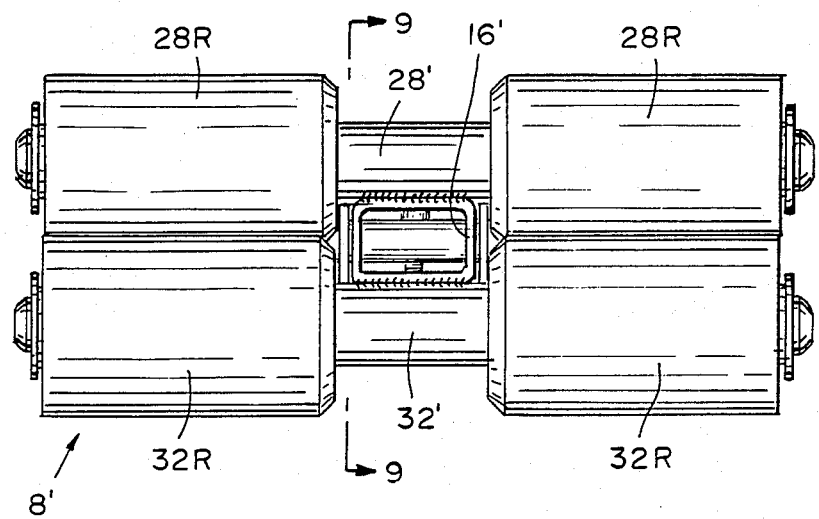
FIG-8-
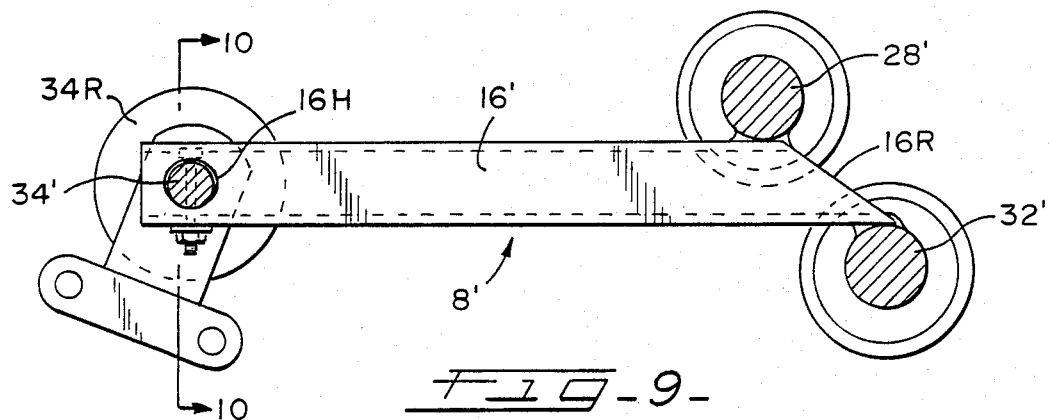
FIG-9-
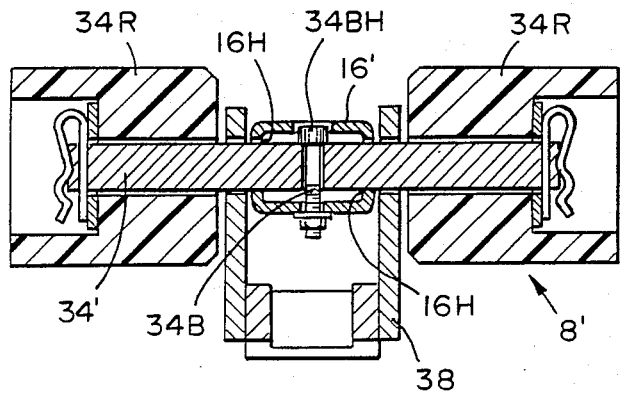
FIG-10-
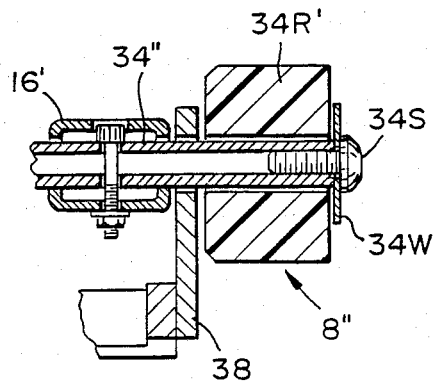
FIG-11-

PUSHER UNIT

FIELD OF THE INVENTION

The present invention is directed to a new and improved pusher unit for use on a vehicle conveyor of the tire-engaging type as is used in car wash systems. (Class 104, subclass 172.)

BACKGROUND OF THE INVENTION

Pusher units for use on vehicle conveyors of the type that contact a tire,.of a vehicle are shown in U.S. Pat. Nos. Re. 30,026 and 3,554,132. U.S. Pat. No. 4,374,496 is specially concerned with an improved pusher unit for use in such a system. Such three-axle, six-roller or "six-wheel" pushers have been widely adopted in the industry.

There exist problems with such prior three-axle pusher units. Such units are difficult and relatively expensive to make and difficult and time-consuming to install (often require shut-down and disassembly of the chain drive). There exists a problem with such units occasionally driving a vehicle wheel over the guide side rails and damaging the vehicle or the carwash equipment.

Further, the hollow ends of the rollers of such prior three-axle pushers which push against the tire, and to a lesser extent against the upper surface of the track, have, after an extended period of use, "crept" inward, binding up the roller, causing it to fail to turn.

This can result in the dragging of the tire against the non-rolling roller or on the track or both, increasing wear and increasing the energy needed to run the conveyor system.

Further, the rolling action between the tires and the rollers which contact the tires has tended to "grab" car wash brush fibers and break them off or pull them out of the brush units. This is a particularly vexing problem, as such brushes are relatively expensive, and the need to frequently replace them drives up the operating costs of the carwash.

SUMMARY OF THE INVENTION

A three-axle pusher unit constructed in accordance with the present invention includes a straight rather than curved or bent bar which has its front end coupled to the chain of a carwash unit and a pair of transverse axle members affixed to the other end of the bar. These are arranged so that the rearward axle is at the bottom of the bar and the intermediate axle is at the top of the bar.

The invention, together with the advantages thereof, may best be understood by reference to the following description taken in connection with the accompanying drawings, in the several figures of which, like reference numerals identify like elements.

BRIEF DESCRIPTION OF THE DRAWINGS

FIG. 1 is a perspective view of a three-axle pusher unit constructed in accordance with the principles of the present invention, shown in use on a slotted track which is depicted broken away and being pulled by an endless chain which is also shown broken away.

FIG. 2 is a side elevational view of the pusher unit of FIG. 1 on a track engaging a vehicle's tire (partially shown).

FIG. 3 is a top or plan view of the pusher unit of FIGS. 1 and 2.

FIG. 4 is an exploded perspective view of the pusher unit of FIGS. 1-3.

FIG. 5 is a sectional view as seen from the plane of the line designated 5—5 in FIG. 3 when looking in the direction of the arrows shown in that Figure through that line.

FIG. 6 is a sectional view as seen from the plane of the line designated 6—6 in FIG. 3 when looking in the direction of the arrows shown in that Figure through that line.

FIG. 7 is a sectional view as seen from the plane of the line designated 7—7 in FIG. 3 when looking in the direction of the arrows shown in that Figure through that line.

FIG. 8 is an end view of a second pusher unit which is also constructed in accordance with the principles of the present invention.

FIG. 9 is a sectional view of the unit of FIG. 8 as seen from the plane defined by the line 9—9 of that figure, looking in the direction of the arrows associated with that line.

FIG. 10 is a sectional view of the front portion of the unit of FIGS. 8 and 9, as seen from the plane defined by the line 10—10 of FIG. 9, looking to the rear, in the direction of the arrows associated with the line 9—9.

FIG. 11 is a partial sectional view similar to that of FIG. 10 of a modified construction to the parts there illustrated.

DETAILED DESCRIPTION OF ONE PREFERRED EMBODIMENT

Referring to the figures and especially FIG. 1, there is depicted a pusher unit constructed in accordance with the principles of the present invention and generally designated by the number 8. The unit 8 is designed to be used with any of the standard carwash conveyor systems such as the system 10 partly depicted in FIG. 1. Such systems are generally disclosed in the aforementioned U.S. Pat. No. 3,554,132, and this system may be the same except for the unit 8. Such a system 10 includes a slotted track 12 and an endless chain 40.

Like the pusher shown in U.S. Pat. No. 4,374,494, the present invention is a "six-wheel" or six-roller, three-axle pusher which employs different sets of rollers for contacting each of the top of the track and the tire.

The novel pusher unit 8 is connected to the chain 40 by means of a special link 42 which has upstanding flanges 38 secured to it by welding or the like.

The main arm or bar 16 of the present novel pusher unit 8 is, in accordance with one feature of the present invention, constructed in a straight length rather than being bent and is formed longer by approximately 10% than that of the aforementioned patent and the bars of commercial six-wheel pusher units. It has one end pivotably coupled to the flanges 38.

The use of a straight bar in a three-axle, "six-wheel" pusher results in a major savings in manufacturing time and equipment. Prior bars, such as that shown in U.S. Pat. No. 4,374,496, and those in common commercial use, require bending of the bar. Besides the extra manufacturing step and special high-force bending equipment needed, the bend tends to stress the bar and often leads to the formation of rust at the areas of stress. (Carwashes are, of necessity, a wet environment, and the presence of water, detergents, and other chemicals makes this a very harsh environment for machinery.)

The pusher 8 has a pair of shafts or axles 28, 32 at its other free end and a third axle 34 at its hinged end.

The shafts 28, 32, 34 are all transverse to the bar 16 and to the direction the pusher is moved. Each of these shafts 28, 32, and 34 projects sideways from the bar 16, to receive rollers 28R, 32R, and 34R.

The shaft or axle 28 has a pair of rollers or sleeves 28R mounted for rotation on it. One of each roller 28R is mounted on the shaft on either side of the bar 16. As shown in FIG. 2, the rollers 28R are above the track 12 for rotary engagement with a vehicle tire 30.

Note should be taken of the fact that, contrary to the common commercial practice and that of U.S. Pat. No. 4,374,496, the axle 32 and the rollers 32R which ride on and over the track 12 are located rearward (toward the free end of the bar 16) from the axle 28 and rollers 28R which contact the vehicle tire 30. This is best shown in FIG. 2. This is directly contrary to the teaching of the aforementioned U.S. Pat. No. Re. 30,026, which teaches that the rearmost axle's roller should be higher than that of the intermediate one. Nevertheless, the present inventor has demonstrated that this opposite arrangement is not only workable but has considerable advantages over that taught in U.S. Pat. No. Re. 30,026.

Note should also be taken from FIG. 2 that the height of the present unit 8 is less than that of prior three-axle pushers and notably less than that of the side guide rail 14 of the system 10. This means that the tire 30 tends to "ride over" the pusher 8 (or the pusher 8 rides under the tire 30) when the vehicle is prevented from moving forward rather than being driven over the side rail 14, as is sometimes the case with three-axle pushers of, e.g., the aforementioned patent. In the hereinafter-detailed prototype, the height "h" of FIG. 2 is approximately 3 ¼ inches. For the commercial three-axle unit made by the assignee of U.S. Pat. No. Re. 30,026, this height is over 4 ¼ inches. (Guard rails 14 are normally about 4 inches high.)

Note should also be had of the low point of contact of the roller 28R and the tire 30 (FIG. 2). This is low enough to avoid the problem of "grabbing" the fibers of the tire brush and pulling them out. This is a considerable advantage over prior high-wheel pushers.

As best shown in FIG. 4, in accordance with one feature of the present invention, the roller sleeve 28R is formed to receive the shaft in a loose fit along the entire length of the rollers 28R. This is a departure from the prior practice of inletting the outer ends of the rollers contacting the wheel so as to accommodate and surround a mechanism for holding the roller on the shaft.

To secure the roller 28R (and also the roller 32R), a washer 28W and machine screw 28S are provided. The screw 28S is received in a threaded bore 28B at the end of the shaft or axle 28. The screw 28S should have a head with a low and flat profile, such as the "button" bolt shown, and preferably have a hex cavity for being driven by a hex-headed tool.

In accordance with one feature of the invention, the roller 28R is, as best shown in FIG. 7, constructed with no major open internal volume at its outer end 28RE, but instead the bar 28 provides continuous support. This prevents the "creep" inward of the ends 28RE as occurs with prior type rollers in prior three-axle pushers.

Novel means for securing the forward axle 34 to the bar 16 is provided and best shown in FIGS. 4, 5, and 6. A steel sleeve or pipe section 16S is welded or otherwise permanently secured to the hinged end of the bar 16. The internal diameter of the sleeve 16S is such that it loosely receives the axle 34 within it. A loose fit insures that the axle may be more easily removed, as the axle 34 is freely received in opening 380 in the flanges of the link 42. Removal of the axle 34 allows the sleeve 16S and the entire pusher unit 8 to be removed from the chain for repair or replacement without the necessity of "breaking" the chain.

While it is desirable to provide a loose fit between the sleeve 16S and the axle 34 for purposes of assembly and disassembly, it is undesirable to have the axle free to move relative to the sleeve after assembly. That is, in this harsh and vibrating environment, a loose part will tend to vibrate sufficiently to cause its fasteners to come loose—resulting in a failure of the pusher and perhaps damage to the system.

The present invention overcomes this problem in a novel way. As shown in FIGS. 5 and 6, the shaft 34 is secured to the sleeve 16S by means of a machine screw or bolt 34B which passes through a bore 34S (FIG. 5) in the shaft 34 and has its threaded end projecting out through a hole 16SH through the sleeve 16S. That end is secured by a nut 34N and lock washer 34L. A second hole 16SW is provided through the sleeve 16; however, this hole 16SW is large enough for the head 34BH of the bolt 34B to pass through it in a loose fit, so that the bolt head 34BH bears against the surface of the shaft 34 and the tightened bolt 24 presses the shaft downward (as seen in FIGS. 5 and 6), so as to seat the shaft 34 tightly against the bottom of the inside of the sleeve 16S.

As an alternative, a large-head bolt or machine screw may be employed with a tubular sleeve of a length greater than the thickness of the walls of the sleeve 16S between the head and the shaft 34. The main point being to transfer the bolt's pressure to the shaft 34 and not to the walls of the sleeve 16S about its opening 16SW.

This approach for connecting a shaft to a sleeve was conceived of by the present inventor and is not known to him to be used elsewhere. As such, it may be of more general application (usable on, e.g., square shafts and square sleeves or other shapes).

The rollers 34R may be conventionally constructed, as shown, with an inletted or hollow interior volume 34V at their ends 34E. They are attached by a washer 34W and by a cotter pin 34P. Alternatively, they can be formed and attached in the novel manner of the roller 28R.

While the rear axle 34 and its securing member 16S are preferably secured at the front end of the unit aligned with the central axis of the straight rod 16, they may also be secured above or below the end of that member that is welded or otherwise secured to its top or bottom surface at its front end. In these cases, a longer rod 16 should be employed and care taken to maintain the relationship of FIG. 2 and proper clearance for the tire 30 from the rod 16.

A pusher unit constructed essentially as depicted and described above has been constructed, tested, and shown to work satisfactorily. This unit had an overall length of approximately 13 inches. The bar 16 had a length of about 10 inches, a width of 1 ½ inches, and a thickness of ⅜ inch and was formed of steel stock. The shafts or axles 28 and 32 were formed from 1-inch steel round stock, with the two shafts being about 9 ¾ inches long. The shaft 34 was about 6 ½ inches long and formed of ⅝-inch diameter steel round stock.

The rollers 28R and 32R were identical to one another and formed from 4-inch lengths of 2 ¼-inch diameter ultra high molecular weight polymer with a central bore slightly larger than one inch. The inner side outer edge was shaved as shown, by approximately ¼ inch. The screws 28S, 32S were ½-inch diameter, 1-inch long shaft hex-head, with 1 ⅜-inch diameter washers 28W, 32W.

The sleeve 16S was made of steel tubing, with an outside diameter of approximately 1 5/16 inches and an inside diameter of about 15/16 inch. It was 1 ½ inches in length, to match the width of the bar 16. The machine screw 34B was ¼ inch in diameter and about 1 ¾ inches in length.

The roller 34R was 2 ½ inches in diameter and 2 ¾ inches in length and made out of the same material as the rollers 28R and 32R. It had a central bore of about ⅞ inch in diameter through 1 ⅜ inches of its length and a larger 1 ¾-inch base through the rest of its length (to form the inlet volume 34V). A quarter-inch slit allowed access to the 1 ½-inch long cotter pin 34P. The washer 34W had a diameter of 1 ¾ inches, and its central opening had a diameter of 1 inch.

While these value sizes and materials are presently preferred, the inventor and his firm may in the future change these as experience and economy may indicate. These sizes and materials are thus given for purposes of a concrete example and not to limit the scope of the invention.

It should be noted, however, that different sizes for the rollers 34R and the shaft 34 are often dictated by particular carwash conveyors—it being one of the advantages of the described structure that it can be easily adapted to these by changing to such other sized rollers and, if needed, a different sized shaft 34.

DESCRIPTION OF OTHER PREFERRED EMBODIMENTS

Referring to FIGS. 8-10, a second embodiment of the invention is depicted in which pivot 8' employs a rectilinear tube 16' as its bar. This construction, as shown best in FIGS. 9 and 10, allows the axle member 34 to be more easily and efficiently secured by passing it through bored holes 16H found on either side of the rear end of the tubular bar 16'. These holes 16H are sized to receive the member 34 in a loose fit. This construction, even though simple and economical to manufacture, is also easy to assemble and disassemble as needed. The use of a tubular steel bar 16' also decreases the weight of the unit (and thus saves in shipping costs) without materially decreasing the strength of the unit or its ability to function in its environment of use. The rear end 16R is obliquely cut between the axles 28' and 32' to present a streamlined appearance and further eliminate unneeded weight from the unit 16.

A prototype has been constructed of this second embodiment substantially according to FIGS. 8-10, and this unit has been tested and shown to perform well.

FIG. 11 illustrates a further modification, wherein rollers 34' (constructed as were the rollers 28R, 32R) may be used on the third axle 34''. These rollers are secured by a bolt 34S and washer 34W to a tapped opening in the end of the member 34''. The prior axles have been shown and are presently preferred to be solid rods; they could also be made of hollow tubes, e.g., tapped for bolts as shown in FIG. 11. And, while the rear rollers have been shown to be of one construction, others can be easily substituted, one also being shown in FIG. 11. It is one of the advantages of the present invention that it allows for easy substitution of front axles and rollers, either at the plant or in the field. Also, while pins and bolt fasteners have been shown for securing the rollers, the present invention may be, in at least its broader aspects, employed with other types of fasteners for releasably holding the rollers onto the axles.

It should now be apparent that a new and improved three-axle pusher unit has been described which overcomes one or more of the drawbacks of prior such pusher units. The pusher has less risk of damaging the vehicle moved or the carwash equipment. It may be more easily fabricated, as it needs less machinery to manufacture. It provides for a longer life by avoiding problems with plastic creep of the tire roller and rust at stress areas, and it provides a novel and easily-used mechanism for disassembling and reassembling the pusher into a chain without breaking the chain. It also is less likely to jam up the conveyor mechanism when moved along the chain under the track because it presents a lower profile and is not as high as prior such three-axle pushers.

While particular embodiments of the invention have been shown and described, it will be obvious to those skilled in the art that changes and modifications may be made without departing from the invention, and, therefore, the aim in the appended claims is to cover all such changes and modifications as fall within the true spirit and scope of the invention.

I claim:

1. A pusher unit for use on an endless-chain conveyor for transporting a vehicle forwardly along a generally horizontal, slotted track positioned above the chain by engaging a tire of the vehicle, comprising:

a straight metal bar having a front end which is adapted to be coupled to the endless chain and a free end which is adapted to project out of a slot in the track;

a pair of transverse axle members affixed to said bar and extending to either side of said bar, one of said axle members being affixed at one of the bottom or top surfaces of said bar near its free end, and the other being affixed to the other of the bottom or top surfaces a short distance forward of the first axle, each of said axles being positioned at a right angle to said bar so as to be transverse to the track slot, said axle members each extending sideways from the bar by a fixed distance;

four roller sleeves mounted for rotation about said axle members, one roller sleeve being mounted on each side extension of said axles, said sleeves having a central bore sized to secure the axle member in a loose fit;

means at the front end of said bar for receiving a third cylindrical axle member, said means and axle member being bolted together through holes formed in both; and a pair of rollers mounted for rotation about the third axle member, one on either side of the bar.

2. A pusher unit as defined in claim 1, wherein said roller sleeves mounted for rotation to said forwardly-mounted axle member are received thereon in a loose fit over their entire length and providing no substantial internal open volume along their lengths between the axle members and the interior surface of the roller sleeve.

3. The pusher unit of claim 1, wherein said means for receiving a third axle member is a sleeve secured at the forward end of said bar.

4. The pusher unit of claim 1, wherein said bar is formed of a hollow tubular shape and said means for receiving a third axle member is a transverse opening through the side walls of the tubular metal bar, said opening being sized to receive said axle member in a loose fit.

5. The pusher unit of claim 4, wherein said tubular bar has a hole through a wall section adjacent said third axle member, said hole being sized to loosely receive the head of a threaded fastener; said third axle member defines a transverse bore that passes through it from one side to the other, said bore being sized to receive the threaded shaft of a fastener but not the head;

a fastener having a head of one size and a threaded shaft of a smaller diameter, said shaft projecting through and out of said bore of said third axle member;

means for coupling with the threaded shaft said fastener which projects out of said bore and allowing it to be advanced therefrom; said means being positioned at the wall of said bar at a point approximately opposite from said hole, whereby the fastener head exerts force against said third axle member and not the bar so as to tightly connect said third axle member against the surface of said bar's openings receiving said third axle member.

6. A pusher unit for use on an endless chain conveyor for transporting a vehicle forwardly along a generally horizontal track positioned above the chain by having the pusher unit engage a tire of the vehicle comprising:

a metal bar having a front end which is adapted to be coupled to the endless chain and a free end which is adapted to project out of a slot in the track;

a pair of transverse axle members affixed to said bar and extending to either side of said bar, one of said axle members being affixed at the bottom surface of said bar near its free end, and the other being affixed to the top surface a short distance forward of the first axle, each of said axles being positioned at a right angle to said bar so as to be transverse to the track slot, said axle members each extending sideways from the bar by a fixed distance;

four roller sleeves mounted for rotation about said axle members, one roller sleeve being mounted on each side extension of said axles, said sleeves having a central bore sized to secure the axle member in a loose fit over their entire length and providing no substantial internal open volume along their lengths between the axle members and the interior surface of the roller sleeve;

a third cylindrical axle member;

means affixed to the front end of said bar for receiving said third cylindrical axle member, said receiving means and axle member being bolted together through holes formed in both; and a pair of rollers mounted for rotation about the third axle member, one on either side of the bar.

* * * * *

UNITED STATES PATENT AND TRADEMARK OFFICE
CERTIFICATE OF CORRECTION

PATENT NO. : 4,873,929

DATED : October 17, 1989

INVENTOR(S) : Frank J. Witecki

It is certified that error appears in the above-identified patent and that said Letters Patent is hereby corrected as shown below:

In the title, insert --IMPROVED CONVEYOR-- before "PUSHER UNIT."

Column 1, line 1, insert --IMPROVED CONVEYOR-- before "PUSHER UNIT."

Column 1, line 2, insert --This is a continuation-in-part of Application Ser. No. 06/882,680, filed July 7, 1986, now abandoned.--.

Signed and Sealed this

Seventh Day of January, 1992

Attest:

HARRY F. MANBECK, JR.

*Attesting Officer*  *Commissioner of Patents and Trademarks*